US012131689B2

(12) United States Patent
Yin et al.

(10) Patent No.: US 12,131,689 B2
(45) Date of Patent: Oct. 29, 2024

(54) DISPLAY DEVICE CAPABLE OF IN-DISPLAY SENSING

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Jia-Sian Lyu, Pingtung County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 18/498,107

(22) Filed: Oct. 31, 2023

(65) Prior Publication Data

US 2024/0153448 A1 May 9, 2024

Related U.S. Application Data

(60) Provisional application No. 63/422,456, filed on Nov. 4, 2022.

(51) Int. Cl.
*G09G 3/32* (2016.01)
*G09G 3/3208* (2016.01)
(Continued)

(52) U.S. Cl.
CPC ............. *G09G 3/32* (2013.01); *G09G 3/3208* (2013.01); *G09G 3/3233* (2013.01); *G09G 3/3275* (2013.01); *G09G 2300/0819* (2013.01); *G09G 2300/0842* (2013.01); *G09G 2300/0852* (2013.01); *G09G 2300/0861* (2013.01); *G09G 2310/0208* (2013.01);
(Continued)

(58) Field of Classification Search
CPC ...... G09G 3/32; G09G 3/3208; G09G 3/3233; G09G 3/3275; G09G 2300/0819; G09G 2300/0842; G09G 2300/0852; G09G 2300/0861; G09G 2310/0208; G09G 2310/0251; G09G 2310/0291; G09G 2310/067; G09G 2310/08; G09G 2320/045; G09G 2360/14; G09G 2360/148; G09G 3/2074; G09G 3/3225; G09G 3/3266
See application file for complete search history.

(56) References Cited

U.S. PATENT DOCUMENTS 11,030,435 B1 * 6/2021 Hung ................ G06V 40/1318
11,164,494 B1 * 11/2021 Hashimoto .......... G09G 3/3233
(Continued)

*Primary Examiner* — Ibrahim A Khan
(74) *Attorney, Agent, or Firm* — Lin & Associates Intellectual Property, Inc.

(57) ABSTRACT

The present invention is related to a display device, including: a plurality of sub-pixel areas, each including a pixel circuit, each pixel circuit including: a diode, configured to be in a forward-biasing state during a displaying phase of the pixel circuit for emitting light and configured to be in a reverse-biasing state in a sensing phase of the pixel circuit so as to generate a sensing voltage; a first circuit by applying gate control signals to each pixel circuit, so that each pixel circuit switches between the display phase and the sensing phase, respectively; and a second circuit including a plurality of readout circuits, each readout circuit includes an operational amplifier for reading out the sensing voltage in the sensing phase.

10 Claims, 6 Drawing Sheets

(51) Int. Cl.
*G09G 3/3233* (2016.01)
*G09G 3/3275* (2016.01)

(52) U.S. Cl.
CPC ............... *G09G 2310/0251* (2013.01); *G09G 2310/0291* (2013.01); *G09G 2310/067* (2013.01); *G09G 2310/08* (2013.01); *G09G 2320/045* (2013.01); *G09G 2360/14* (2013.01); *G09G 2360/148* (2013.01)

(56) References Cited

U.S. PATENT DOCUMENTS

| | | | | |
|---|---|---|---|---|
| 11,656,124 | B1 * | 5/2023 | Furui | G01J 1/44 250/200 |
| 2015/0030217 | A1 * | 1/2015 | Wickboldt | G06F 3/0443 382/124 |
| 2015/0364107 | A1 * | 12/2015 | Sakariya | G06F 3/042 345/82 |
| 2017/0090028 | A1 * | 3/2017 | Djordjev | G01S 15/89 |
| 2018/0276439 | A1 * | 9/2018 | Strohmann | G06F 1/169 |
| 2019/0123080 | A1 * | 4/2019 | Kanicki | H10K 19/20 |
| 2020/0342196 | A1 * | 10/2020 | Chang | G09G 3/3688 |
| 2021/0097318 | A1 * | 4/2021 | Chung | H04N 25/78 |
| 2021/0305294 | A1 * | 9/2021 | Chung | H01L 27/14689 |
| 2021/0407453 | A1 * | 12/2021 | Shih | G09G 3/3648 |
| 2022/0067340 | A1 * | 3/2022 | Han | G06V 40/1365 |
| 2023/0104772 | A1 * | 4/2023 | Kim | H10K 59/1201 257/40 |
| 2023/0317007 | A1 * | 10/2023 | Kim | G09G 3/3233 345/76 |

* cited by examiner

DISPLAY DEVICE CAPABLE OF IN-DISPLAY SENSING

BACKGROUND OF THE INVENTION

1. Field of the Invention

The present invention relates generally to a display device, and more particularly, to a display device able to realize both display and sensing functions in the same pixel circuit to provide an in-screen sensing function.

2. The Prior Arts

In general, a display device often only has a display function. Some display devices provides both display and touch functions. However, when sensing is required, for example, when an optical fingerprint sensor (OFPS) is used for sensing, the optical fingerprint sensor will need to be implemented as an independent device. In addition, when the optical sensing module is bonded under the display device, there will be additional cost, additional thickness, and additional yield risk during bonding.

Moreover, since the sensing area depends on the area of the sensor, the sensing area will be much smaller than the area of the entire panel. In addition, since the optical sensing module is attached to the bottom of the display device, components between the sensed object and the sensor may block the light.

Therefore, it is necessary to provide a display device that can integrate the sensing function and the display function in the same pixel circuit to overcome the above problems.

SUMMARY OF THE INVENTION

In order to achieve the objective of effectively solving the above problems, the present invention provides a display device, including: a plurality of sub-pixel areas, each including a pixel circuit, each pixel circuit including: a diode, configured to a forward-biasing state in a display phase of the pixel circuit for emitting light and configured to a reverse-biasing state in a sensing phase of the pixel circuit for generating a sensing voltage; a driving transistor, for driving the diode in the display phase; first to fifth transistors, gates of the first to fifth transistors being respectively applied with first to fifth gate control signals, so that the first to fifth transistors switching between the display phase and the sensing phase; and a storage capacitor, for storing a data voltage to be written to the diode in the display phase; a first circuit, by applying the five gate control signals to each pixel circuit to switch each pixel circuit between the display phase and the sensing phase respectively; and a second circuit, for applying the data voltage, a driving voltage, and a common voltage, the second circuit including a plurality of readout circuits, and each readout circuit including: an operational amplifier for reading out the sensing voltage in the sensing phase.

Preferably, each readout circuit is connected and corresponds to a plurality of pixel circuits in a same column to amplify and read out the sensing voltage in the pixel circuits in the column.

Preferably, in each pixel circuit, a first electrode of the first transistor is connected to the driving voltage, a second electrode of the first transistor is connected to a first node, a first electrode of the second transistor is connected to the first node, a second electrode of the second transistor is connected to a second node, a first electrode of the third transistor is applied with the data voltage, and a second electrode of the third transistor is connected to a third node, a first electrode of the fourth transistor is connected to the third node, a second electrode of the fourth transistor is connected to a fourth node, a first electrode of the fifth transistor is connected to the fourth node, a second electrode of the fifth transistor is connected to a fifth node of the readout circuit, and a gate electrode of the driving transistor is connected to the second node, a first electrode of the driving transistor is connected to the first node, a second electrode of the driving transistor is connected to the fourth node, and a first electrode of the diode is connected to the fourth node, a second electrode of the diode is applied with the common voltage, and both ends of the storage capacitor are connected to the second node and the third node respectively.

Preferably, each readout circuit further includes: a readout transistor, whose first electrode is connected to the fifth node, a second electrode is applied with a first readout voltage, and a gate is applied with a sixth gate control signal; a first capacitor with two ends connected to the fifth node and a sixth node respectively; a second capacitor with both ends connected to the sixth node and an output end of the operational amplifier respectively; a third capacitor with one end connected to the sixth node and the other end is applied with a second readout voltage; and an amplifier switch with one end connected to the output end of the operational amplifier and one end connected to the sixth node, wherein a positive terminal of the operational amplifier is connected to a reference voltage and a negative terminal is connected to the sixth node for outputting an amplified voltage at the output end according to the sensing voltage, the first capacitor, and the second capacitor in the sensing phase.

Preferably, the sensing phase includes: a first sensing phase, for initializing the diode so that the diode is in the reverse-biasing state; a second sensing phase, for making the diode accumulate charge at the fourth node; and a third sensing phase, for storing the sensing voltage into the first capacitor and using the operational amplifier to read out the sensing voltage.

Preferably, in the first sensing phase: the first to sixth gate control signals respectively control the first to fifth transistors and the readout transistor, so that the second transistor, the third transistor, the fifth transistor, and the readout transistor are on, and the first transistor and the fourth transistor are off; the amplifier switch remains on, the first readout voltage is a negative voltage, the data voltage is the negative voltage, and the second readout voltage is a ground level that is the same as the common voltage; in the second sensing phase: the first to sixth gate control signals control the first to fifth transistors and the readout transistor respectively, so that the fourth transistor and the readout transistor are on, the first transistor, and the second transistor, the third transistor, and the fifth transistor are off; the amplifier switch remains on, the first readout voltage is the negative voltage, and the data voltage is at the ground level, and the second readout voltage is at the ground level; in the third sensing phase: the first to sixth gate control signals control the first to fifth transistors and the readout transistor respectively, so that the first transistor changes from off to on at a second time point after a first time point, causing the second transistor to be off, causing the third transistor to be on, causing the fourth transistor to be off, causing the fifth transistor to be on, and causing the readout transistor to be turned off; and the amplifier switch changes from on to off at the first time point, the first readout voltage is the negative voltage, and the data voltage is at the ground level, and the second readout voltage changes from the ground level to the negative voltage at the second time point.

Preferably, the display phase includes: a 1-1 display phase, for pre-charging the pixel circuit; a 1-2 display phase, for writing the data voltage; a 1-3 display phase, for preparing the diode to emit light; and a second sensing phase, for making the diode emit light according to the data voltage.

Preferably, in the 1-1 display phase, the first to sixth gate control signals control the first to fifth transistors and the readout transistor respectively, so that the first transistor, the second transistor, the third transistor, the fifth transistor, and the readout transistor are on, and the fourth transistor is off; in the 1-2 display phase, the first to sixth gate control signals control the first to fifth transistors and the readout transistor respectively, so that the second transistor, the third transistor, the fifth transistor, and the readout transistor are on, and the first transistor and the fourth transistor are off; in the 1-3 display phase, the first to sixth gate control signals control the first to fifth transistors and the readout transistor respectively, so that the readout transistor is on, and the first transistor, the second transistor, the third transistor, the fourth transistor, and the fifth transistor are turned off; in the second display phase, the first to sixth gate control signals control the first to fifth transistors and the readout transistor respectively, so that the first transistor, the fourth transistor, and the readout transistor are on, and the second transistor, the third transistor, and the fifth transistor are off; during the second display phase, the amplifier switch remains on, the first readout voltage is at a ground level, and the second readout voltage is at a ground level that is the same as the common voltage.

Preferably, the diode includes one of a micro light-emitting diode, a sub-millimeter light-emitting diode, and an organic light-emitting diode.

Preferably, the transistors include one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

The present invention will be apparent to those skilled in the art by reading the following detailed description of a preferred embodiment thereof, with reference to the attached drawings.

DETAILED DESCRIPTION OF THE PREFERRED EMBODIMENT

Figure 1A:
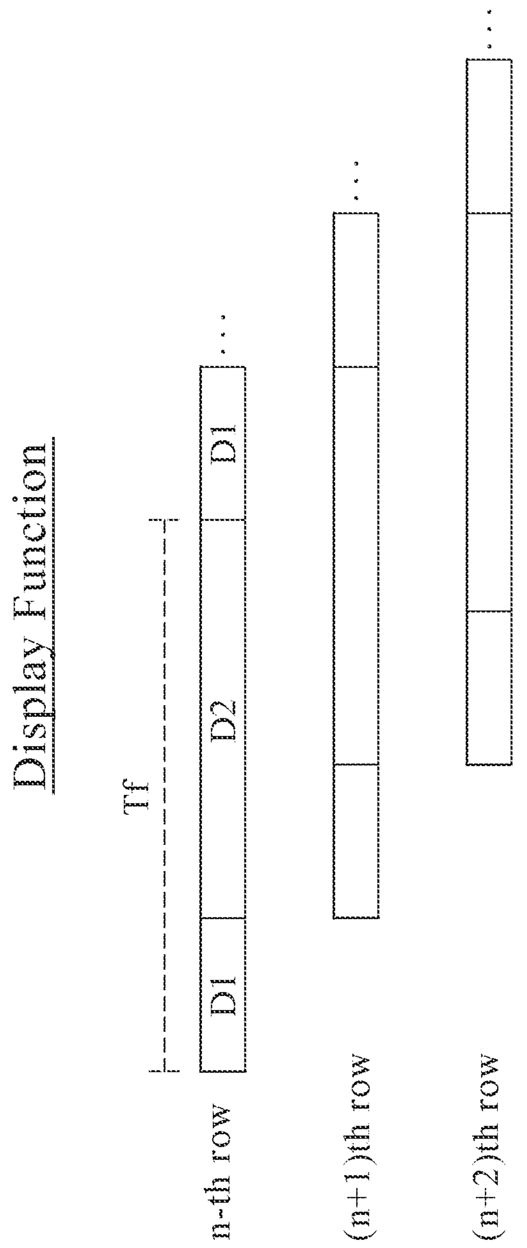
FIG. 1A is an operation timing diagram of a display device with only a display function.

The accompanying drawings are included to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

It should be noted that the pixel circuit of the present invention can be implemented in any sub-pixel such as red sub-pixel, blue sub-pixel, green sub-pixel, white sub-pixel, etc., but the present invention is not limited thereto.

Refer to FIG. 1A. FIG. 1A is an operation timing diagram of a display device with only a display function. As shown in FIG. 1A, the display device with only a display function is displayed in a row-by-row manner, from the upper left corner to the lower right corner, and finally forms an image frame. One frame time Tf includes: the first display phase D1, which is used to initialize the circuit and write data; the second display phase D2, which is used to emit light to display data. Since the display device only has a display function, one frame time Tf is equal to the sum of the first display phase D1 to the second display phase D2.

It should be understood that when the circuit is actually operating, there will be switching time between each phase. For ease of understanding, in this specification, the duration of each phase includes the actual execution of the corresponding action and switching to the next phase. For example, the first display phase D1 includes the time of initializing the circuit, writing data, and switching to the second display phase D2.

Figure 1B:
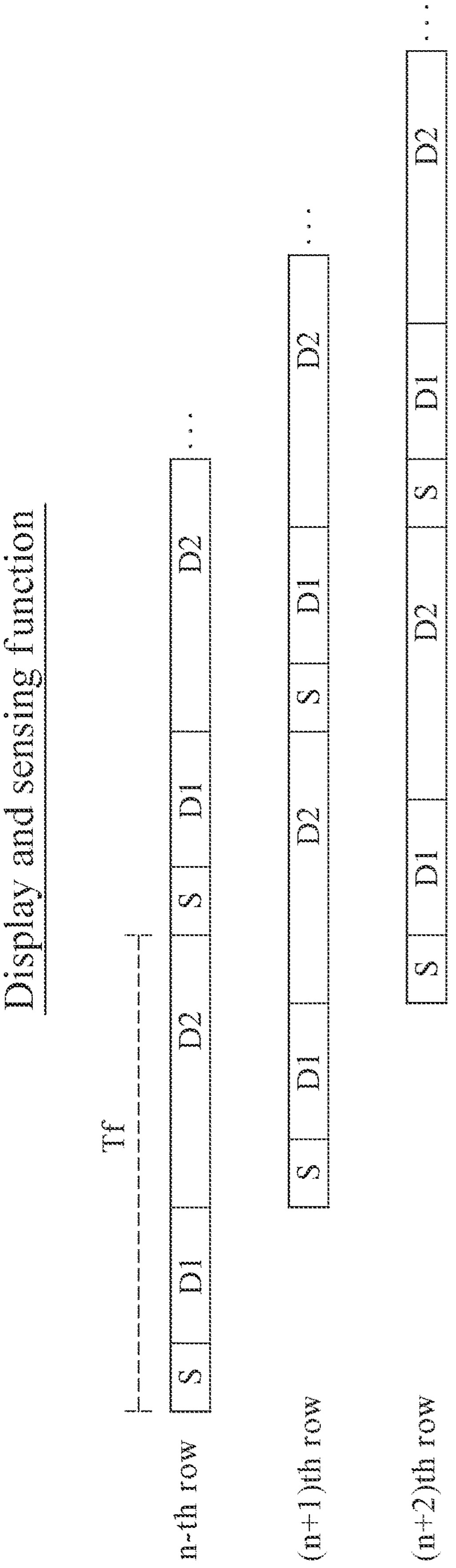
FIG. 1B is an operation timing diagram of the display device of the present invention.

Refer to FIG. 1B, which is an operation timing diagram of the display device of the present invention. Since the present invention integrates the sensing function and the display function into the same pixel circuit in the display device, the frame time Tf of the present invention further includes a sensing phase S for sensing data. Therefore, through the design of the circuit and the control of the gate control signal, the operation timing of the display device of the present invention is adjusted to include the sensing phase S and the display phase, which includes the first display phase D1 to the second display phase D2.

It can be understood that, according to the user's settings, at the same point in time, the pixel circuits in the display device may be in different stages. For example, the pixel circuits in different rows may be in different stages. In addition, since the sensing phase S and the display phase of the present invention are achieved by controlling the gate control signal GCS to adjust the operating sequence, the sensor of the display device can be turned on or off the sensing phase S at any time according to the user's settings and needs.

Figure 2:
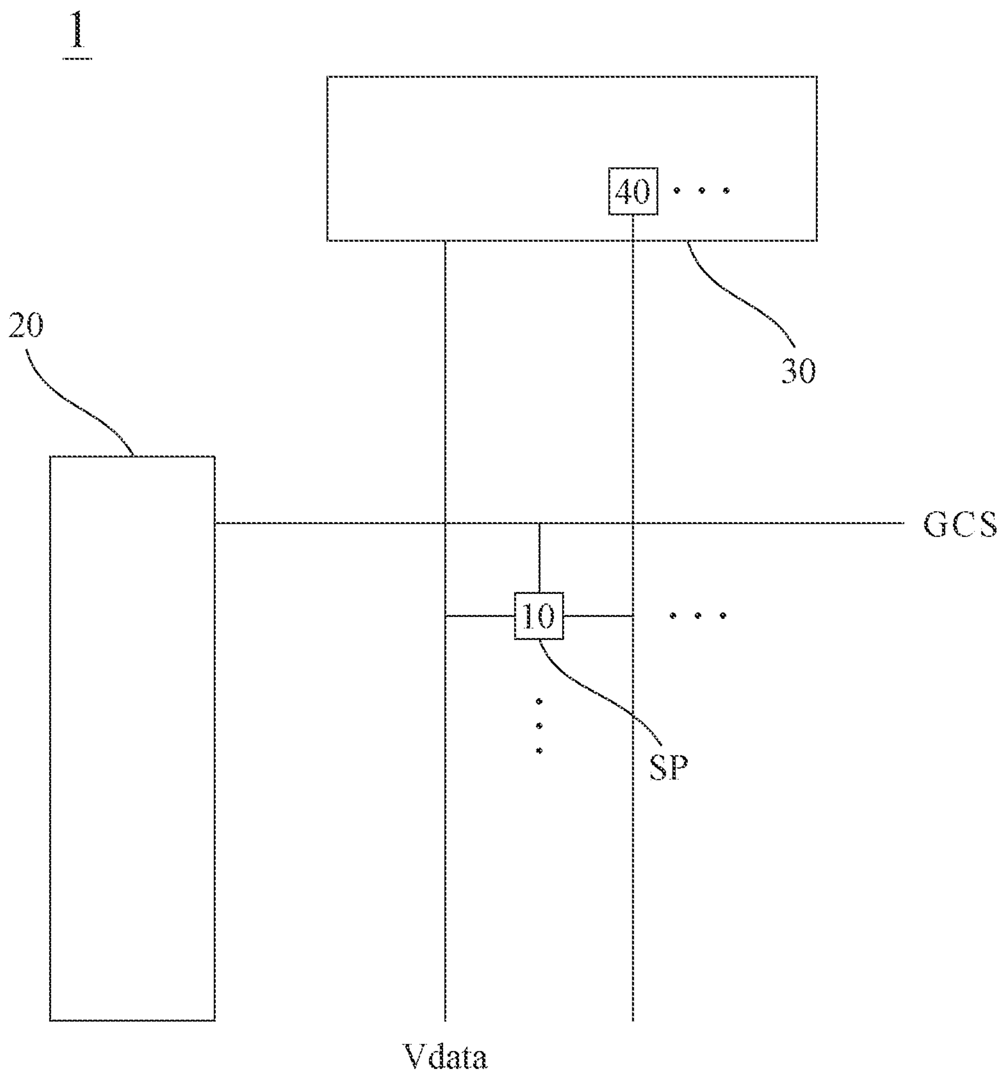
FIG. 2 is a structural diagram of a display device according to an embodiment of the present invention.

Refer to FIG. 2, which is a structural diagram of a display device 1 according to an embodiment of the present invention.

As shown in FIG. 2, the display device 1 of the present invention includes: a plurality of sub-pixel areas SP, each including a pixel circuit 10; a first circuit 20, by applying a gate control signal GCS to each pixel circuit 10, so that each pixel circuit 10 can switch between the display phase and the sensing phase S respectively. For example, the first circuit 20 can be a row circuit; and a second circuit 30, used to apply the data voltage Vdata and including a plurality of readout circuit 40, and each readout circuit 40 is connected to a plurality of pixel circuits 10 in the same column, for reading out the light sensed by the diode LED in the pixel circuit 10 during the sensing phase S, for example, the second circuit 30 may be a column circuit.

It should be understood that the first circuit 20 may be, for example, one of a row circuit or a column circuit. The second circuit 30 may be, for example, one of a row circuit or a column circuit, but the present invention is not limited thereto.

It should be understood that the readout circuit 40 of the present invention is respectively connected to a plurality of pixel circuits 10 in the same column. That is, one readout circuit 40 corresponds to a plurality of pixel circuits 10 in one column to read out the light sensed by the diode LEDs in the pixel circuits 10 in the column.

It should be noted that the pixel circuit 10 of the display device of the present invention is divided into a sensing phase S and a display phase by applying the gate control signal GCS. In the sensing phase S, the diode LED is under reverse-biasing to sense light as a photodiode. Then, the diode LED accumulates charges in an integral mode. Finally, the accumulated charges are amplified and read out. In the display phase, the diode LED is in forward-biasing to emit light as a light-emitting diode to display data according to the data voltage Vdata. It can be understood that the diode LED of the present invention includes, but is not limited to, micro-LEDs (micro-LEDs), sub-millimeter light-emitting diodes (mini-LEDs), and organic light-emitting diodes (OLEDs).

Figure 3:
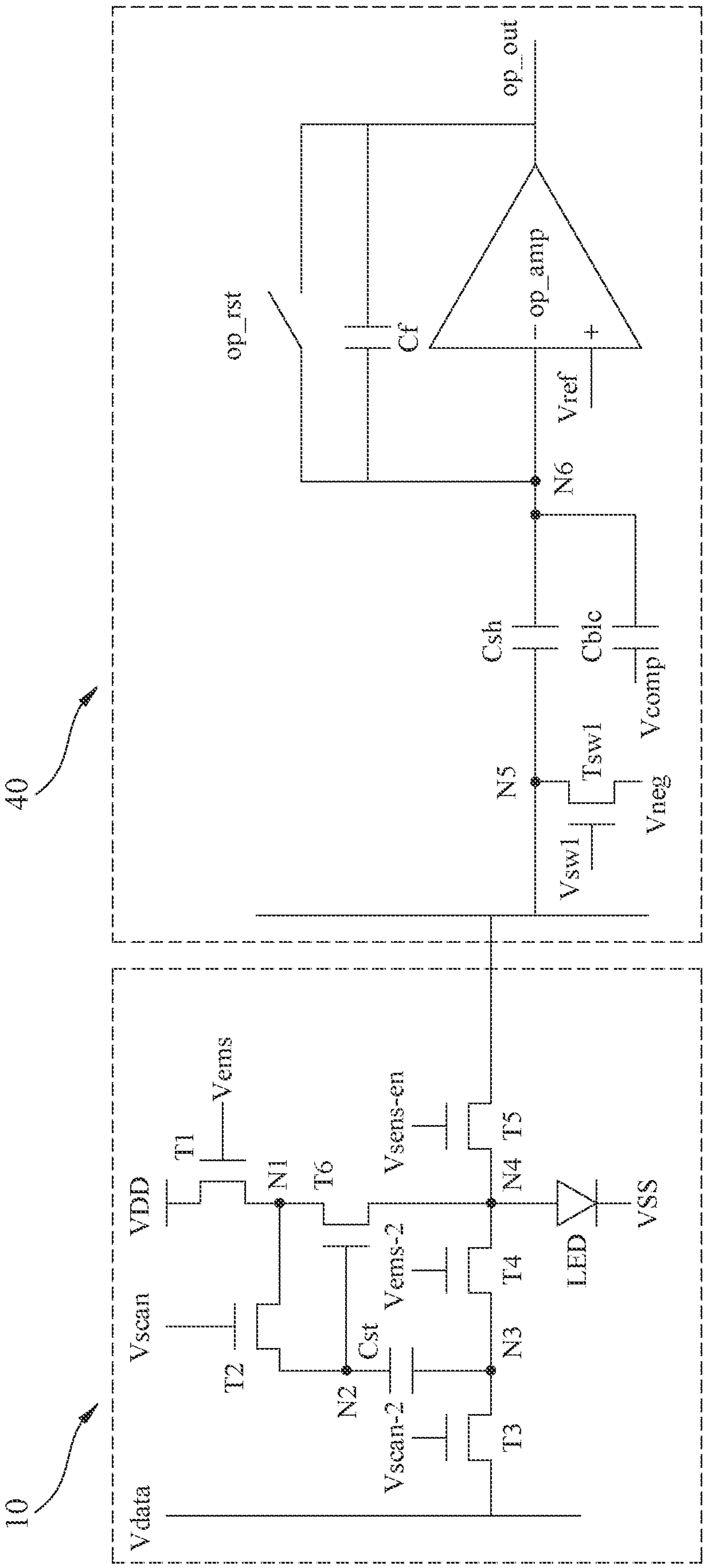
FIG. 3 is a circuit diagram of a pixel circuit and a readout circuit according to an embodiment of the present invention.

Refer to FIG. 3, which is a circuit diagram of the pixel circuit 10 and the readout circuit 40 according to an embodiment of the present invention.

As shown in FIG. 3, the pixel circuit 10 of the present invention includes: first to fifth transistors T1 to T5; a driving transistor T6; a diode LED; and a storage capacitor Cst. The gate control signal GCS includes a first gate control signal Vems, a second gate control signal Vscan, a third gate control signal Vscan-2, a fourth gate control signal Vems-2 and a fifth gate control signal Vsens_en. The first transistor T1 is controlled by the first gate control signal Vems, the second transistor T2 is controlled by the second gate control signal Vscan, and the third transistor T3 is controlled by the third gate control signal Vscan-2. The fourth transistor T4 is controlled by the fourth gate control signal Vems-2 and the fifth transistor T5 is controlled by the fifth gate control signal Vsens_en. Moreover, the data voltage Vdata, a driving voltage VDD, and a common voltage VSS are applied to the pixel circuit 10.

Referring to FIG. 3, in the pixel circuit 10, the first electrode of the first transistor T1 is connected to the driving voltage VDD, and the second electrode of the first transistor T1 is connected to the first node N1. The first electrode is connected to the first node N1, and the second electrode of the second transistor T2 is connected to the second node N2. The first electrode of the third transistor T3 is applied with the data voltage Vdata, and the second electrode of the third transistor T3 is connected to the third node N3. The first electrode of the fourth transistor T4 is connected to the third node N3, and the second electrode of the fourth transistor T4 is connected to the fourth node N4. The first electrode of the fifth transistor T5 is connected to the fourth node N4, and the second electrode of the fifth transistor T5 are connected to the readout circuit 40. The gate of the driving transistor T6 is connected to the second node N2, the first electrode of the driving transistor T6 is connected to the first node N1, and the second electrode of the driving transistor T6 is connected to the fourth node N4. The first electrode of the diode LED is connected to the fourth node N4, the second electrode of the diode LED is applied with the common voltage VSS, and both ends of the storage capacitor Cst are respectively connected to the second node N2 and the third node N3.

As shown in FIG. 3, the readout circuit 40 of the present invention includes: a readout transistor Tsw1, the first electrode of the readout transistor Tsw1 is connected to the fifth node N5, a first readout voltage Vneg is applied to the second electrode, and a six-gate control signal Vsw1 is applied to the gate; operational amplifier op_amp, the positive terminal of the operational amplifier op_amp is connected to the reference voltage Vref, and the negative terminal is connected to the sixth node N6, and is used to output the amplified voltage op_out; an amplifier switch op_rst, having one end connected to the output terminal of the operational amplifier op_amp, and tone end connected to the sixth node N6; a first capacitor Csh, having both ends connected to the fifth node N5 and the sixth node N6 respectively; a second capacitor Cf, having both ends connected to the sixth node N6 and the output end of the operational amplifier op_amp respectively; a third capacitor Cb1*c*, having one end connected to the sixth node N6 and the second readout voltage Vcomp applied to the other end.

Figure 4:
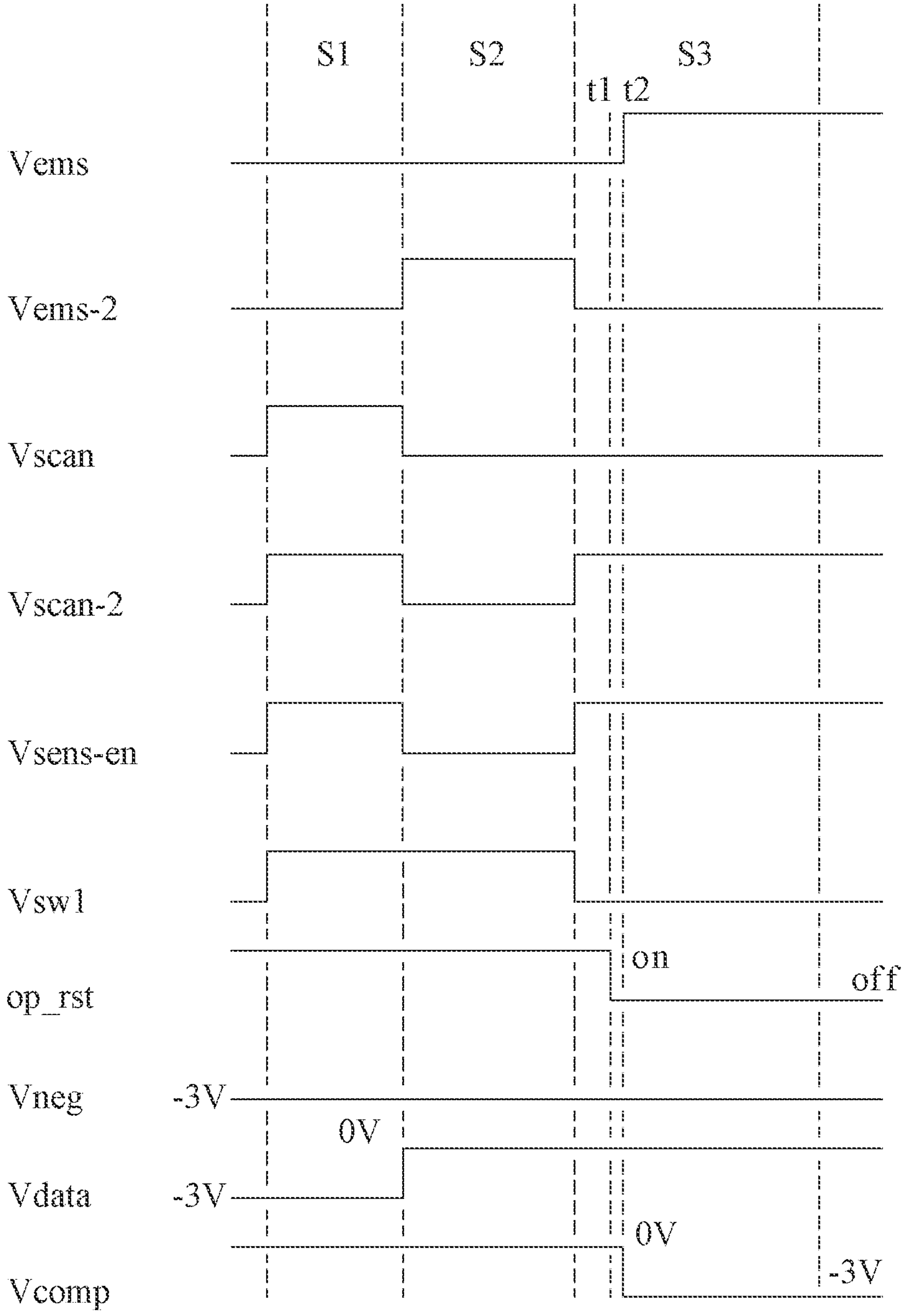
FIG. 4 is a timing operation diagram illustrating the sensing phase of the pixel circuit and the readout circuit according to an embodiment of the present invention.

In the following, the circuit operation of the pixel circuit 10 and the readout circuit 40 of the present invention in the sensing phase S will be described with reference to FIGS. 3 and 4. FIG. 4 is a timing operation diagram illustrating the sensing phase S of the pixel circuit 10 and the readout circuit 40 according to an embodiment of the present invention. The sensing phase S of the present invention includes: a first sensing phase S1, which is used to initialize the diode LED so that the diode LED is in reverse-biasing to sense light as a photodiode; a second sensing phase S2, wherein the diode LED starts to accumulate charge as a photodiode (here, the diode LED is used as a photodiode to sense light, and the charge accumulated at the fourth node N4 is defined as the sensing voltage Vsig); and a third sensing phase S3, wherein the sensing voltage Vsig is stored in the first capacitor Csh, and then the sensing voltage Vsig is amplified using the operational amplifier op_amp.

Specifically, referring to FIGS. 3 and 4, in the first sensing phase S1, according to the first gate control signal Vems, the second gate control signal Vscan, the third gate control signal Vscan-2, the fourth Control of gate control signal Vems-2, the fifth gate control signal Vsens-en, and sixth gate control signal Vsw1, the second transistor T2, the third transistor T3, the fifth transistor T5, and the readout transistor Tsw1 are turned on, while the first transistor T1 and the fourth transistor T4 are turned off. Since the fifth transistor T5 and the readout transistor Tsw1 are turned on, the first readout voltage Vneg is applied to the fourth node N4. At this point, the first readout voltage Vneg is a negative voltage, for example, −3V. Therefore, the fourth node N4 is equal to the first readout voltage Vneg, that is, −3V. In addition, since the second transistor T2 is turned on, the charge on the second node N2 is discharged to the fourth node N4 through the driving transistor T6 until the voltage of the second node N2 is equal to the threshold voltage Vth of the driving transistor T6 plus the voltage of the fourth node N4, i.e., the threshold voltage Vth+(−3). Moreover, since the third transistor T3 is turned on, the third node N3 is at the data voltage Vdata. At this point, the data voltage Vdata is set equal to the first readout voltage Vneg, that is, −3V. Therefore, finally, the voltage across the storage capacitor Cst is the second node N2 minus the third node N3.

That is, (Vth+(−3))−(−3)=threshold voltage Vth. In other words, the voltage across the storage capacitor Cst is the threshold voltage Vth of the driving transistor T6. At this point, the amplifier switch op_rst is turned on (i.e., short-circuited), and the second readout voltage Vcomp is 0V (herein, 0V is defined as the ground level of the common voltage VS S, but is not limited thereto).

Specifically, referring to FIGS. 3 and 4, in the second sensing phase S2, under the control of the first gate control signal Vems, the second gate control signal Vscan, the third gate control signal Vscan-2, the fourth gate control signal Vems-2, the fifth gate control signal Vsens-en, and the sixth gate control signal Vsw1, the fourth transistor T4 and the readout transistor Tsw1 are turned on, and the first transistor T1, the second transistor T2, the third transistor T3, and the fifth transistor T5 are turned off. Since the third transistor T3 and the fifth transistor T5 are turned off, the charges from the fifth node N5 and the data voltage Vdata are blocked. Moreover, since the fourth transistor T4 is turned on, the voltage of the third node N3 is equal to the voltage of the fourth node N4. And, since the voltage of the fourth node N4 is (−3V+Vsig) and the voltage of the fourth node N4 is equal to the voltage of the third node N3, the voltage of the second node N2 is equal to (Vth+(−3V)+Vsig), and the voltage across the storage capacitor Cst is still the threshold voltage Vth of the driving transistor T6. At this point, the amplifier switch op_rst remains on, the first readout voltage Vneg remains at −3V, the data voltage Vdata changes from −3V to 0V, and the second readout voltage Vcomp remains at 0V. Therefore, in the second sensing phase S2, the diode LED starts sensing to generate the sensing voltage Vsig, and the storage capacitor Cst couples the sensing voltage Vsig to the second node N2, and the voltage across the storage capacitor Cst is still the threshold voltage Vth of the driving transistor T6.

Specifically, referring to FIGS. 3 and 4, in the third sensing phase S3, under the control of the first gate control signal Vems, the second gate control signal Vscan, the third gate control signal Vscan-2, the fourth gate control signal Vems-2, the fifth gate control signal Vsens-en, and the sixth gate control signal Vsw1, the first transistor T1 turns from off to on at a second time point t2, the transistor T2 is off, the third transistor T3 is on, the fourth transistor T4 is off, the fifth transistor T5 is on, and the readout transistor Tsw1 is off. Moreover, the amplifier switch op_rst changes from on to off (i.e., open circuit) at a first time point t1, the first readout voltage Vneg remains at −3V, the data voltage Vdata remains at 0V, and the second readout voltage Vcomp changes from 0V to −3V at the second time point t2.

Herein, the circuit operation of the aforementioned third sensing phase S3 is described in detail. At the beginning of the third sensing phase S3, since the third transistor T3 is on, the fourth transistor T4 is off, and the data voltage Vdata is at 0V, the third node N3 changes from (−3V+Vsig) to 0V. And due to the voltage across the storage capacitor Cst, the voltage of the second node N2 becomes the threshold voltage Vth of the driving transistor T6. And since the fifth transistor T5 is on, the readout transistor Tsw1 is off, and the voltage of the fourth node N4 is (−3V+Vsig), (−3V+Vsig) is stored in the first capacitor Csh. Next, the amplifier switch op_rst changes from on to off (i.e., open circuit) at the first time point t1; and then, at the second time point t2, the first transistor T1 turns from off to on, and the second readout voltage Vcomp changes from 0V to −3V. Therefore, the driving voltage VDD is connected to the first electrode of the driving transistor T6, so that a current flows to the fourth node N4 until the voltage of the fourth node N4 becomes 0V.

Then, since Vgs of the driving transistor T6 is equal to Vth at this point, the driving transistor T6 becomes turned off. Then, because the fourth node N4 changes from (−3V+Vsig) to 0V, and due to the voltage across the first capacitor Csh, the sixth node N6 changes to 0−(−3V+Vsig), that is, 3V-Vsig. At this point, since the second readout voltage Vcomp changes from 0V to −3V and is also coupled to the negative terminal of the operational amplifier op_amp, the voltage across the first capacitor Csh becomes Vref+(3V-Vsig)+(−3V)=Vref-Vsig. Finally, according to the amplification of the operational amplifier op_amp, the obtained amplification voltage op_out is equal to Vsig*Csh/Cf. That is, the sensing voltage Vsig can be calculated from the ratio of the first capacitance Csh to the second capacitance Cf and the obtained amplified voltage op_out.

Figure 5:
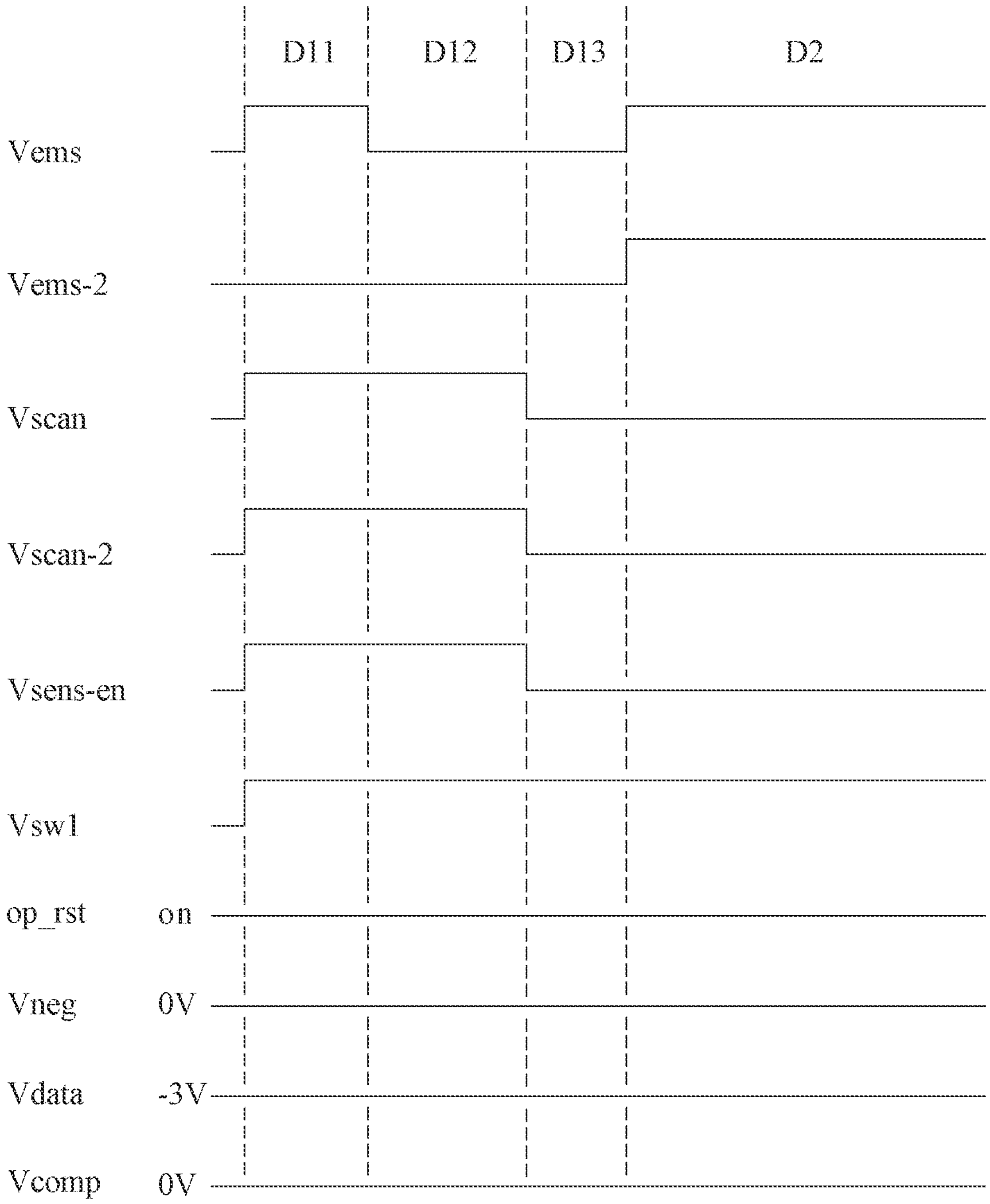
FIG. 5 is a timing operation diagram illustrating the display phase of the pixel circuit and the readout circuit according to an embodiment of the present invention.

In the following, the circuit operation of the pixel circuit 10 and the readout circuit 40 of the present invention in the display phase will be described with reference to FIGS. 3 and 5. FIG. 5 is a timing operation diagram illustrating the display phase of the pixel circuit 10 and the readout circuit 40 according to the embodiment of the present invention. The display phase of the present invention includes: the first display phase D1, which is used to initialize the circuit and write data; the second display phase D2, which is used to emit light to display data. Wherein, the first display phase D1 is divided into a 1-1 display phase D11, a 1-2 display phase D12, and a 1-3 display phase D13.

Specifically, referring to FIGS. 3 and 5, in the 1-1 display phase D11, under the control of the first gate control signal Vems, the second gate control signal Vscan, the third gate control signal Vscan-2, the fourth gate control signals Vems-2, the fifth gate control signal Vsens-en, and the sixth gate control signal Vsw1, the first transistor T1, the second transistor T2, the third transistor T3, the fifth transistor T5, and the readout transistor Tsw1 are on, and the fourth transistor T4 is off. Moreover, the amplifier switch op_rst remains on (i.e., short-circuited), the first readout voltage Vneg remains at 0V, and the second readout voltage Vcomp remains at 0V. Herein, it is assumed that the applied data voltage Vdata is, for example, −3V. Therefore, since the first transistor T1 and the second transistor T2 are turned on, the second node N2 is at the level of the driving voltage VDD. Since the third transistor T3 is turned on, the voltage of the third node N3 is the data voltage Vdata (for example, −3V). Since the fifth transistor T5 and the readout transistor Tsw1 are on and the first readout voltage Vneg is 0V (the level of the common voltage VSS), the fourth node N4 is at 0V. Finally, since the voltage across the diode LED is 0V, the diode LED does not emit light. Therefore, the 1-1 display phase D11 is the pre-charge phase.

Specifically, referring to FIGS. 3 and 5, in the 1-2 display phase D12, under the control of the first gate control signal Vems, the second gate control signal Vscan, the third gate control signal Vscan-2, the fourth gate control signals Vems-2, the fifth gate control signal Vsens-en, and the sixth gate control signal Vsw1, the second transistor T2, the third transistor T3, the fifth transistor T5, and the readout transistor Tsw1 are turned on, while the first transistor T1 and the fourth transistor T4 are turned off. Moreover, the amplifier switch op_rst remains on (i.e., short-circuited), the first readout voltage Vneg remains at 0V, the data voltage Vdata remains at, for example, −3V, and the second readout voltage Vcomp remains at 0V. Therefore, since the first transistor T1 is turned off, the current from the driving voltage VDD will be blocked. In addition, the third transistor T3 remains on, and the third node N3 is still at the data voltage Vdata (for example, −3V). In addition, because the fifth transistor T5 and the readout transistor Tsw1 remain on and because the first readout voltage Vneg is 0V, the fourth node N4 is still at 0V (the level of the common voltage VSS), so the current still does not flow into the diode LED. Moreover, the second node N2 is discharged through the second transistor T2 and the driving transistor T6 until the voltage of the second node N2 is equal to the threshold voltage Vth of the driving transistor T6. At this point, the driving transistor T6 will be turned off, and the voltage across the storage capacitor Cst will be equal to the voltage of the second node N2 minus the voltage of the third node N3, that is, the threshold voltage Vth minus the data voltage Vdata. Therefore, the 1-2 display phase D12 is the data writing phase.

Specifically, referring to FIGS. 3 and 5, in the 1-3 display phase D13, under the control of the first gate control signal Vems, the second gate control signal Vscan, the third gate control signal Vscan-2, the fourth gate control signal Vems-2, the fifth gate control signal Vsens-en, and the sixth gate control signal Vsw1, the readout transistor Tsw1 is turned on, while the first transistor T1, the second transistor T2, the third transistor T3, the fourth transistor T4, and the fifth transistor T5 are turned off. Therefore, since the first transistor T1, the second transistor T2, the third transistor T3, the fourth transistor T4, and the fifth transistor T5 are all turned off, the voltage of the second node N2 is equal to the voltage of the third node N3, and remains at the same level as in the 1-2 display phase D12. Therefore, the 1-3 display phase D13 is the pre-display phase.

Specifically, referring to FIGS. 3 and 5, in the second display phase D2, under the control of the first gate control signal Vems, the second gate control signal Vscan, the third gate control signal Vscan-2, the fourth gate control signal Vems-2, the fifth gate control signal Vsens-en, and the sixth gate control signal Vsw1, the first transistor T1, the fourth transistor T4, and the readout transistor Tsw1 are turned on, while the transistor T2, the third transistor T3, and the fifth transistor T5 are turned off. Therefore, since the first transistor T1 and the fourth transistor T4 are on, the driving voltage VDD is connected to the first electrode of the driving transistor T6, and since the third node N3 is connected to the second electrode of the driving transistor T6, a current flows through the diode LED, causing the diode LED to emit light.

Here, the current Iled flowing through the diode LED in the second display phase D2 is further described. In the second display phase D2, the gate-source voltage Vgs of the driving transistor T6 is equal to the voltage across the storage capacitor Cst in the 1-3 display phase D13, that is, the gate-source voltage Vgs is equal to the threshold voltage Vth minus the data voltage Vdata. For example, if Vth=1V, Vdata=−3V, then Vgs equals 1−(−3)=4V. The current I_led flowing through the diode LED will be equal to the saturation current of the driving transistor T6. That is, $I\_led = \frac{1}{2}k*W/L(Vgs-Vth)^2$. Then, the input gate source voltage Vgs is equal to the threshold voltage Vth minus the data voltage Vdata. $I\_led = \frac{1}{2}k*W/L((Vth-Vdata)-Vth)$ $2 = \frac{1}{2}k*W/L(-Vdata)^2$, wherein k is a process parameter, and the data voltage Vdata is the information to be displayed.

As such, the pixel circuit 10 can realize that: in the sensing phase S, the diode LED is under reverse-biasing to sense light as a photodiode, and then the diode LED accumulates charges in an integral mode. Finally, the accumulated charge is amplified and read out; and in the display phase, the diode LED is under forward-biasing to emit light as a light-emitting diode to display data according to the data voltage Vdata.

It should be understood that the embodiment of the present invention uses an N-type metal oxide semiconductor (NMOS) field effect transistor as an exemplary transistor in the pixel circuit 10. However, the present invention is not limited thereto. The transistor used in the pixel circuit of the present invention can be arbitrarily implemented as P-type PMOS field effect transistor, thin film transistor (TFT), low-temperature polycrystalline silicon (LTPS) TFT, low-temperature polycrystalline oxide (LTPO) TFT, etc. In addition, as long as it complies with the inventive concept of the present invention, the transistors can also be combined arbitrarily to form the pixel circuit of the present invention. For example, some transistors are implemented as PMOS and other transistors are implemented as NMOS. Therefore, those skilled in the art can easily understand that the inventive concept of the present invention can be applied to pixel circuits using various types of transistors without being limited by the characteristics of the transistors.

Finally, the technical features of the present invention and its achievable technical effects are summarized as follows:

First, the display device of the present invention can realize both display and sensing functions in the same pixel circuit to have an in-screen sensing function.

Second, since the display device of the present invention uses the same pixel circuit to realize both display and sensing functions at the same time, there is no element between the sensed object and the sensor that will block the light. Therefore, the present invention can achieve more accurate sensing.

Third, since the display device of the present invention uses the same pixel circuit to achieve both display and sensing functions, the total thickness of the screen is thinner, redundant manufacturing processes are not required, and the yield risk caused by additional bonding is reduced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A display device, comprising:

a plurality of sub-pixel areas, each comprising a pixel circuit, each pixel circuit further comprising:

a diode, configured to a forward-biasing state in a display phase of the pixel circuit for emitting light and configured to a reverse-biasing state in a sensing phase of the pixel circuit for generating a sensing voltage;

a driving transistor, for driving the diode in the display phase;

first to fifth transistors, gates of the first to fifth transistors being respectively applied with first to fifth gate control signals, so that the first to fifth transistors switching between the display phase and the sensing phase; and a storage capacitor, for storing a data voltage to be written to the diode in the display phase;

a first circuit, by applying the five gate control signals to each pixel circuit to switch each pixel circuit between the display phase and the sensing phase respectively; and a second circuit, for applying the data voltage, a driving voltage, and a common voltage, the second circuit including a plurality of readout circuits, and each readout circuit comprising:

an operational amplifier for reading out the sensing voltage in the sensing phase.

2. The display device according to claim 1, wherein each readout circuit is connected and corresponds to a plurality of pixel circuits in a same column to amplify and read out the sensing voltage in the pixel circuits in the column.

3. The display device according to claim 1, wherein in each pixel circuit, a first electrode of the first transistor is connected to the driving voltage, a second electrode of the first transistor is connected to a first node, a first electrode of the second transistor is connected to the first node, a second electrode of the second transistor is connected to a second node, a first electrode of the third transistor is applied with the data voltage, and a second electrode of the third transistor is connected to a third node, a first electrode of the fourth transistor is connected to the third node, a second electrode of the fourth transistor is connected to a fourth node, a first electrode of the fifth transistor is connected to the fourth node, a second electrode of the fifth transistor is connected to a fifth node of the readout circuit, and a gate electrode of the driving transistor is connected to the second node, a first electrode of the driving transistor is connected to the first node, a second electrode of the driving transistor is connected to the fourth node, and a first electrode of the diode is connected to the fourth node, a second electrode of the diode is applied with the common voltage, and both ends of the storage capacitor are connected to the second node and the third node respectively.

4. The display device according to claim 3, wherein each readout circuit further comprises:

a readout transistor, whose first electrode is connected to the fifth node, a second electrode is applied with a first readout voltage, and a gate is applied with a sixth gate control signal;

a first capacitor with two ends connected to the fifth node and a sixth node respectively;

a second capacitor with both ends connected to the sixth node and an output end of the operational amplifier respectively;

a third capacitor with one end connected to the sixth node and the other end is applied with a second readout voltage; and an amplifier switch with one end connected to the output end of the operational amplifier and one end connected to the sixth node;

wherein a positive terminal of the operational amplifier is connected to a reference voltage and a negative terminal is connected to the sixth node for outputting an amplified voltage at the output end according to the sensing voltage, the first capacitor, and the second capacitor in the sensing phase.

5. The display device according to claim 4, wherein the sensing phase comprises:

a first sensing phase, for initializing the diode so that the diode is in the reverse-biasing state;

a second sensing phase, for making the diode accumulate charge at the fourth node; and a third sensing phase, for storing the sensing voltage into the first capacitor and using the operational amplifier to read out the sensing voltage.

6. The display device according to claim 5, wherein:

in the first sensing phase:

the first to sixth gate control signals respectively control the first to fifth transistors and the readout transistor, so that the second transistor, the third transistor, the fifth transistor, and the readout transistor are on, and the first transistor and the fourth transistor are off; and the amplifier switch remains on, the first readout voltage is a negative voltage, the data voltage is the negative voltage, and the second readout voltage is a ground level that is the same as the common voltage;

in the second sensing phase:

the first to sixth gate control signals control the first to fifth transistors and the readout transistor respectively, so that the fourth transistor and the readout transistor are on, the first transistor, and the second transistor, the third transistor, and the fifth transistor are off; and the amplifier switch remains on, the first readout voltage is the negative voltage, and the data voltage is at the ground level, and the second readout voltage is at the ground level;

in the third sensing phase:

the first to sixth gate control signals control the first to fifth transistors and the readout transistor respectively, so that the first transistor changes from off to on at a second time point after a first time point, causing the second transistor to be off, causing the third transistor to be on, causing the fourth transistor to be off, causing the fifth transistor to be on, and causing the readout transistor to be turned off; and the amplifier switch changes from on to off at the first time point, the first readout voltage is the negative voltage, and the data voltage is at the ground level, and the second readout voltage changes from the ground level to the negative voltage at the second time point.

7. The display device according to claim 4, wherein the display phase comprises:

a 1-1 display phase, for pre-charging the pixel circuit;

a 1-2 display phase, for writing the data voltage;

a 1-3 display phase, for preparing the diode to emit light; and a second sensing phase, for making the diode emit light according to the data voltage.

8. The display device according to claim 7, wherein:

in the 1-1 display phase, the first to sixth gate control signals control the first to fifth transistors and the readout transistor respectively, so that the first transistor, the second transistor, the third transistor, the fifth transistor, and the readout transistor are on, and the fourth transistor is off;

in the 1-2 display phase, the first to sixth gate control signals control the first to fifth transistors and the readout transistor respectively, so that the second transistor, the third transistor, the fifth transistor, and the readout transistor are on, and the first transistor and the fourth transistor are off;

in the 1-3 display phase, the first to sixth gate control signals control the first to fifth transistors and the readout transistor respectively, so that the readout transistor is on, and the first transistor, the second transistor, the third transistor, the fourth transistor, and the fifth transistor are turned off;

in the second display phase, the first to sixth gate control signals control the first to fifth transistors and the readout transistor respectively, so that the first transistor, the fourth transistor, and the readout transistor are on, and the second transistor, the third transistor, and the fifth transistor are off;

during the display phase, the amplifier switch remains on, the first readout voltage is at a ground level, and the second readout voltage is at a ground level that is the same as the common voltage.

9. The display device according to claim 1, wherein the diode comprises one of a micro light-emitting diode, a sub-millimeter light-emitting diode, and an organic light-emitting diode.

10. The display device according to claim 1, wherein the transistors include one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

* * * * *